United States Patent
Francis et al.

(10) Patent No.: US 8,031,119 B1
(45) Date of Patent: Oct. 4, 2011

(54) DETERMINING THE ANGLE OF ARRIVAL OF A TARGET SIGNAL RECEIVED BY AN ARRAY OF ANTENNA ELEMENTS

(75) Inventors: James Covosso Francis, Honeoye Falls, NY (US); David Delaney McGann, Penfield, NY (US)

(73) Assignee: L-3 Services, Inc., San Diego, CA (US)

( * ) Notice: Subject to any disclaimer, the term of this patent is extended or adjusted under 35 U.S.C. 154(b) by 299 days.

(21) Appl. No.: 12/511,783

(22) Filed: Jul. 29, 2009

(51) Int. Cl.
*G01S 5/04* (2006.01)

(52) U.S. Cl. ........................................ 342/444
(58) Field of Classification Search ............ 342/444
See application file for complete search history.

(56) References Cited

U.S. PATENT DOCUMENTS 6,160,758 A * 12/2000 Spiesberger ............ 367/125
6,898,235 B1 * 5/2005 Carlin et al. ............ 375/219

* cited by examiner

*Primary Examiner* — Harry Liu
(74) *Attorney, Agent, or Firm* — Edward W. Callan (57) ABSTRACT

In a system for determining the angle of arrival of a target signal received by an array of antenna elements, a pair of receivers simultaneously obtain observations of a received target signal from multiple elements of an array of antenna elements; and a computer processes the simultaneously obtained samples of the target signal to determine a maximum likelihood estimation (MLE) of the angle of arrival $\phi$ of the target signal by using the following equation: $\phi_{MLE} = \mathrm{argmax}_\phi \mathrm{Re}(\alpha^* \beta)$. The value of $\beta$ is determined in accordance with whether the target signal is known or unknown. When the target signal is unknown, the computer also processes the simultaneously obtained samples of the target signal to estimate the bandwidth of the received target signal by using binary hypotheses and a generalized log likelihood ratio test (GLLRT) or by using multiple hypotheses and pair-wise generalized log likelihood ratio tests. The value of a bandwidth constraint M that is associated with the estimated bandwidth is used to derive the value of $\beta$ that is used to determine the MLE of $\phi$.

28 Claims, 1 Drawing Sheet

DETERMINING THE ANGLE OF ARRIVAL OF A TARGET SIGNAL RECEIVED BY AN ARRAY OF ANTENNA ELEMENTS

BACKGROUND OF THE INVENTION

The present invention generally pertains to determining the angle of arrival (AOA) of a target signal received by an array of antenna elements.

Arrays of antenna elements are commonly used in a system for estimating the AOA of a received target signal. For tactical signal-intercept applications it is desirable for the signal-intercept hardware to be of minimal size, weight, and power (SWAP). To realize minimal SWAP it is desirable to use a single receiver and to commutate the antenna elements of the array.

SUMMARY OF THE INVENTION

The present invention provides a method of estimating the angle of arrival of a target signal received by an array of antenna elements, comprising the steps of:

(a) with a pair of receivers, simultaneously obtaining samples of a received target signal from multiple elements of an array of antenna elements; and (b) with a computer, processing the simultaneously obtained samples of the target signal to determine a maximum likelihood estimation (MLE) of the angle of arrival $\phi$ of the target signal by using the following equation:

$$\phi_{MLE} = \mathrm{argmax}_\phi Re(\alpha^* \beta)$$

wherein $\alpha$ is a complex vector that represents a phase difference associated with the angle of arrival that should be observed upon receipt of the signal by two particular antenna elements from which the samples are obtained; and $\beta$ represents the phase difference that is observed upon receipt of the signal by the two particular antenna elements from which the samples are obtained;

wherein when the target signal is unknown, $\beta_n = y^*_{2n-1} y_{2n}$ in the time domain and $\beta_n = Y^*_{2n-1} Y_{2n}$ in the frequency domain, wherein $y_{2n-1}$ and $y_{2n}$ are complex N-tuple vectors representing the samples obtained from the nth simultaneously sampled pair of antenna elements and Y is a Fourier transform of y.

The present invention also provides a method of estimating the angle of arrival of a target signal received by an array of antenna elements, comprising the steps of:

(a) with a pair of receivers, simultaneously obtaining samples of a received target signal from multiple elements of an array of antenna elements; and (b) with a computer, processing the simultaneously obtained samples of the target signal to determine a maximum likelihood estimation (MLE) of the angle of arrival $\phi$ of the target signal by using the following equation:

$$\phi_{MLE} = \mathrm{argmax}_\phi Re(\alpha^* \beta)$$

wherein $\alpha$ is a complex vector that represents a phase difference associated with the angle of arrival that should be observed upon receipt of the signal by two particular antenna elements from which the samples are obtained; and $\beta$ represents the phase difference that is observed upon receipt of the signal by the two particular antenna elements from which the samples are obtained;

wherein when the target signal is known, $$\beta_n = \frac{(x^*_n y_{2n-1}) * (x^*_n y_{2n})}{|x_n|^2}$$

in the time domain and $$\beta_n = \frac{(X^*_n Y_{2n-1}) * (X^*_n Y_{2n})}{|X_n|^2}$$

in the frequency domain, wherein X and Y are Fourier transforms of x and y respectively, wherein $x_n$ and $X_n$ are complex N-tuple vectors representing the known target signal in the time domain and in the frequency domain respectively; and wherein $y_{2n-1}$ and $y_{2n}$ are complex N-tuple vectors representing the samples obtained from the nth simultaneously sampled pair of antenna elements and Y is a Fourier transform of y.

The present invention further provides a method of estimating the bandwidth of a target signal received by an array of antenna elements, comprising the steps of:

(a) with a pair of receivers, simultaneously obtaining samples of a received target signal from multiple elements of an array of antenna elements; and (b) with a computer, processing the simultaneously obtained samples of the target signal to estimate the bandwidth of the received target signal by using binary hypotheses and a generalized log likelihood ratio test (GLLRT).

The present invention still further provides a method of estimating the bandwidth of a target signal received by an array of antenna elements, comprising the steps of:

(a) with a pair of receivers, simultaneously obtaining samples of a received target signal from multiple elements of an array of antenna elements; and (b) with a computer, processing the simultaneously obtained samples of the target signal to estimate the bandwidth of the received target signal by using multiple hypotheses and pair wise generalized log likelihood ratio tests in accordance with:

$$\begin{aligned} \|E(M_1)\|^2 - \|E(M_2)\|^2 &< \lambda(M_1, M_2) \\ \|E(M_1)\|^2 - \|E(M_3)\|^2 &< \lambda(M_1, M_3) \end{aligned} \Rightarrow M_1$$

wherein M specifies a bandwidth constraint expressed by a set of tuples of $X(\phi)$ where $X(\phi)$ may be non-zero, $X(\phi)$ is an estimate of the Fourier transform of the unknown target signal, Y is a Fourier transform of the sample obtained from the sampled antenna element, and $$\|E(M)\|^2 = <Y_1, Y_1> + <Y_2, Y_2> -c(<Y_1, Y_1>_M + 2|<Y_1, Y_2>_M| + <Y_2, Y_2>_M).$$

The present invention additionally provides systems for performing the above-described methods and computer readable storage media including computer executable program instructions for causing one or more computers to perform and/or enable the steps of the respective above-described methods.

Additional features of the present invention are described with reference to the detailed description.

DETAILED DESCRIPTION

Figure 1:
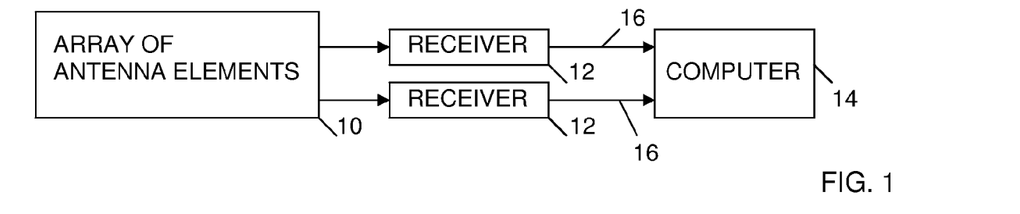
FIG. 1 is a block diagram of an exemplary system in which the methods of the present invention are performed.

Referring to FIG. 1, an exemplary system in which the methods of the present invention are performed includes an array of antenna elements 10, a pair of receivers 12 and a computer 14. The computer 14 contains a digital signal processor and computer readable storage media that includes computer executable program instructions for causing the computer to perform and/or enable the various processing steps that are described herein. These instructions are stored in the computer readable storage media of the computer when the computer is manufactured and/or upon being downloaded via the Internet or from a portable computer readable storage media containing such instructions.

Figure 2:
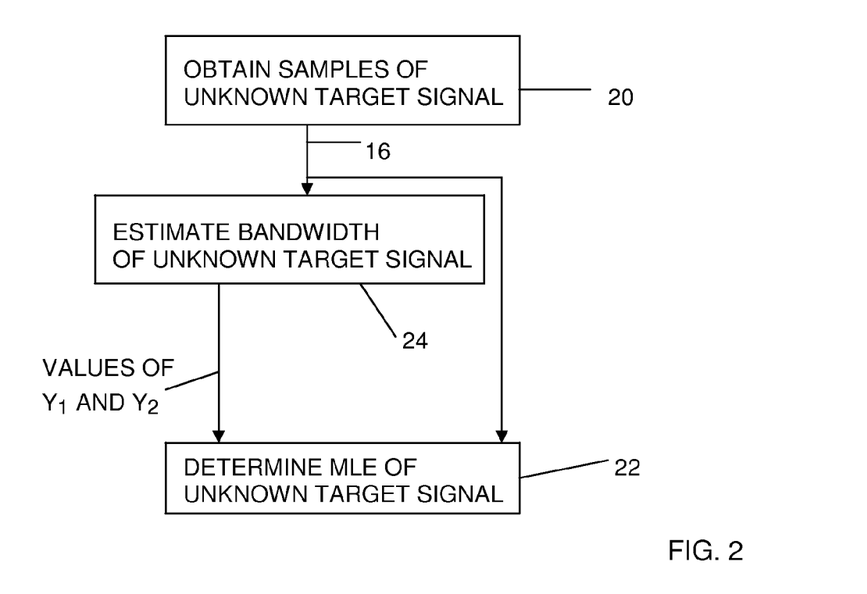
FIG. 2 is a diagram generally showing an embodiment of a method of the present invention that is used when the target signal is unknown.
Figure 3:
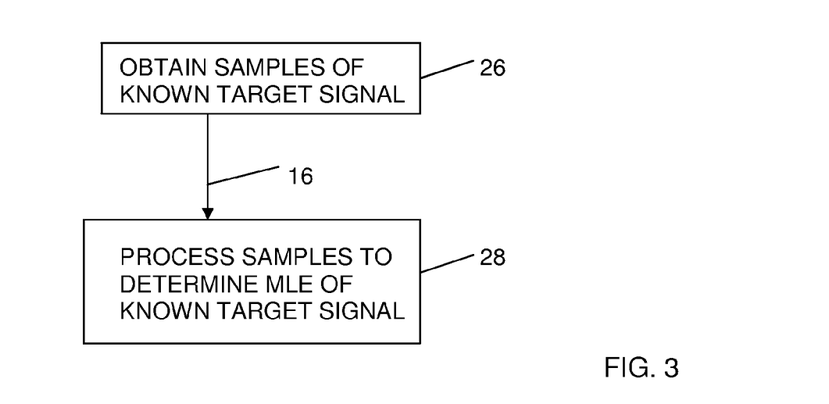
FIG. 3 is a diagram generally showing an embodiment of a method of the present invention that is used when the target signal is known.

Samples 16 of a received target signal are simultaneously obtained by the pair of receivers 12 from multiple elements of an array of antenna elements 10 (as shown at 20 in FIG. 2 and at 26 in FIG. 3); and the computer 14 is adapted for processing the simultaneously obtained samples 16 of the target signal (as shown at 22 in FIG. 2 and at 28 in FIG. 3) to determine a maximum likelihood estimation (MLE) of the angle of arrival $\phi$ of the target signal by using the following equation:

$$\phi_{MLE} = \operatorname{argmax}_\phi Re(\alpha^* \beta) \quad [\text{Eq. 1}]$$

$\alpha$ is a complex vector that represents a phase difference associated with the angle of arrival that should be observed upon receipt of the signal by two particular antenna elements from which the samples are obtained; and $\beta$ represents the phase difference that is observed upon receipt of the signal by the two particular antenna elements from which the samples are obtained. The symbol * is a Hermitian operator.

When the target signal is unknown, in the time domain, $$\beta_n = y^*_{2n-1} y_{2n} \quad [\text{Eq. 2}]$$

and in the frequency domain, $$\beta_n = Y^*_{2n-1} Y_{2n} \quad [\text{Eq. 3}]$$

$y_{2n-1}$ and $y_{2n}$ are complex N-tuple vectors representing the samples obtained from the nth simultaneously sampled pair of antenna elements and Y is a Fourier transform of y. In a preferred embodiment, When the target signal is known, in the time domain, $$\beta_n = \frac{(x_n^* y_{2n-1}) * (x_n^* y_{2n})}{|x_n|^2} \quad [\text{Eq. 4}]$$

and in the frequency domain, $$\beta_n = \frac{(X_n^* Y_{2n-1}) * (X_n^* Y_{2n})}{|X_n|^2} \quad [\text{Eq. 5}]$$

X and Y are Fourier transforms of x and y respectively, and $x_n$ and $X_n$ are complex N-tuple vectors representing the known target signal in the time domain and in the frequency domain respectively. $y_{2n-1}$ and $y_{2n}$ are complex N-tuple vectors representing the samples obtained from the nth simultaneously sampled pair of antenna elements.

For a phased array of antenna elements, whether or not the target signal is known, $$\alpha_n = e^{i(\mu_{2n}(\phi) - \mu_{2n-1}(\phi))} \quad [\text{Eq. 6}]$$

$\mu$ is a function of the angle of arrival that depends upon the geometry of the array of antenna elements.

Referring to FIG. 2, the computer 14 is also adapted for processing the simultaneously obtained samples 16 of the target signal when the target signal is unknown to estimate the bandwidth of the target signal, as shown at 24.

In one embodiment, the computer 14 is adapted for estimating the bandwidth of the received target signal by using binary hypotheses and a generalized log likelihood ratio test (GLLRT):

$$\|E(M_1)\|^2 - \|E(M_2)\|^2 \underset{M_2}{\overset{M_1}{\lessgtr}} \lambda(M_1, M_2) \quad [\text{Eq. 7}]$$

$\lambda(M_1, M_2)$ is an appropriately chosen constant threshold. M specifies a bandwidth constraint expressed by a set of tuples of $X(\phi)$ where $X(\phi)$ may be non-zero. $X(\phi)$ is an estimate of the Fourier transform of the unknown target signal. Y is a Fourier transform of the sample obtained from the sampled antenna element.

$$\|E(M)\|^2 = <Y_1, Y_1> + <Y_2, Y_2> -c(<Y_1, Y_1>_M + 2|<Y_1, Y_2>_M| + <Y_2, Y_2>_M) \quad [\text{Eq. 8}]$$

In another embodiment, the computer 14 is adapted for estimating the bandwidth of the received target signal by using multiple hypotheses and pair wise generalized log likelihood ratio tests in accordance with:

$$\begin{aligned} \|E(M_1)\|^2 - \|E(M_2)\|^2 &< \lambda(M_1, M_2) \\ \|E(M_1)\|^2 - \|E(M_3)\|^2 &< \lambda(M_1, M_3) \end{aligned} \Rightarrow M_1 \quad [\text{Eq. 9}]$$

M specifies a bandwidth constraint expressed by a set of tuples of $X(\phi)$ where $X(\phi)$ may be non-zero. $X(\phi)$ is an estimate of the Fourier transform of the unknown target signal. Y is a Fourier transform of the sample obtained from the sampled antenna element.

$$\|E(M)\|^2 = <Y_1, Y_1> + <Y_2, \qquad [\text{Eq. 8}]$$
$$Y_2> -c(<Y_1, Y_1>_M +2|<Y_1, Y_2>_M| + <Y_2, Y_2>_M);$$

The computer 14 is further adapted for deriving the value of $\beta_n = Y^*_{2n-1} Y_{2n}$ in the frequency domain or the value of $\beta_n = <Y_{2n-1}, Y_{2n}>_M$ in the frequency domain or the value of $\beta_n = <y_{2n-1}, y_{2n}>_M$ in the time domain by using the respective value M that is associated with the estimated bandwidth pursuant to the applicable GLLRT or GLLRTs.

Referring to FIG. 3, when the target signal is known, samples of the target signal are obtained as shown at 28, and the computer 14 processes the samples 16 in accordance with above-recited Equations 1, 4 and 5 to determine the MLE of the angle of arrival φ of the target signal.

A discussion of the applicability of various equations to different embodiments of the present invention follows.

Single Pair of Antenna Elements and an Unknown Target Signal

Consider first the estimation of an MLE for the AOA with two receivers when the target signal is unknown. Suppose two antenna elements are sampled simultaneously, and N samples are observed on each element. Let the complex N-tuple vectors $y_1$ and $y_2$ denote the samples observed on the first element and second element, respectively. Then, $$\begin{pmatrix} y_1 \\ y_2 \end{pmatrix} = \begin{pmatrix} e^{j\mu_1(\phi)}I \\ e^{j\mu_2(\phi)}I \end{pmatrix} x + \begin{pmatrix} v_1 \\ v_2 \end{pmatrix} \qquad [\text{Eq. 10}]$$

The vector x denotes the unknown target signal. $e^{j\mu_1(\phi)}$ and $e^{j\mu_2(\phi)}$ are unit modulus complex gains on each antenna element that are related to the AOA φ. For a uniform circular array of antenna elements, $\mu_k(\phi) = 2\pi r/\lambda \sin(\phi - \theta_k)$. Any non-unit modulus of the gain may be regarded as absorbed into x. I is the compatible identity matrix. The vector $v_k$ is complex additive white Gaussian noise (AWGN), and the noise from each antenna element is assumed to be independent.

For AWGN the MLE for φ is given by, $$\phi_{MLE} = \arg\min_\phi \left\| \begin{pmatrix} y_1 \\ y_2 \end{pmatrix} - \begin{pmatrix} e^{j\mu_1(\phi)}I \\ e^{j\mu_2(\phi)}I \end{pmatrix} x(\phi) \right\|^2 \qquad [\text{Eq. 11}]$$

where x(φ) is the least-squares optimal estimate of x and is dependent on φ.

Equation 11 is a time-domain problem. Alternatively, this may be reformulated in the frequency domain, as follows. Let $W_N$ denote the linear transformation associated with an N-point DFT, and let $$W2_N = \begin{pmatrix} W_N & 0 \\ 0 & W_N \end{pmatrix} \qquad [\text{Eq. 12}]$$

Note that $W2_N \neq W2_N$. First, $W2_N$ is unitary ($W2_N^* W2_N = I$), as $W_N$ is unitary. Hence, multiplication by $W2_N$ does not change the length of a vector, and Equation 12 may be rewritten as, $$\phi_{MLE} = \arg\min_\phi \left\| W2_N \left\{ \begin{pmatrix} y_1 \\ y_2 \end{pmatrix} - \begin{pmatrix} e^{j\mu_1(\phi)}I \\ e^{j\mu_2(\phi)}I \end{pmatrix} x(\phi) \right\} \right\|^2 \qquad [\text{Eq. 13}]$$

Secondly, $$W2_N \begin{pmatrix} y_1 \\ y_2 \end{pmatrix} = \begin{pmatrix} W_N y_1 \\ W_N y_2 \end{pmatrix} = \begin{pmatrix} Y_1 \\ Y_2 \end{pmatrix}, \qquad [\text{Eq. 14}]$$

where $Y_k$ is the N-point DFT of $y_k$ (i.e. U denotes the Fourier transform of u). Therefore, Equation 13 may be rewritten as, $$\phi_{MLE} = \arg\min_\phi \left\| \begin{pmatrix} Y_1 \\ Y_2 \end{pmatrix} - \begin{pmatrix} e^{j\mu_1(\phi)}I \\ e^{j\mu_2(\phi)}I \end{pmatrix} X(\phi) \right\|^2 \qquad [\text{Eq. 15}]$$

Note that $$\begin{pmatrix} e^{j\mu_1(\phi)}I \\ e^{j\mu_2(\phi)}I \end{pmatrix} x(\phi) = \begin{pmatrix} e^{j\mu_1(\phi)}x(\phi) \\ e^{j\mu_2(\phi)}x(\phi) \end{pmatrix} \qquad [\text{Eq. 16}]$$

Equation 15 is a least-squares problem. Let, $$A(\phi) = \begin{pmatrix} e^{j\mu_1(\phi)}I \\ e^{j\mu_2(\phi)}I \end{pmatrix} \qquad [\text{Eq. 17}]$$

Then Equation 17 may be rewritten as, $$\phi_{MLE} = \arg\min_\phi \|Y - A(\phi)X(\phi)\|^2 \qquad [\text{Eq. 18}]$$

It is a standard result from linear algebra that X(φ) is given by, $$A(\phi)^* A(\phi) X(\phi) = A(\phi)^* Y \qquad [\text{Eq. 19}]$$

Since A(φ) is orthogonal, $$X(\phi) = c A(\phi)^* Y \qquad [\text{Eq. 20}]$$

for some real constant c.

As the optimal error vector is orthogonal to the column space of A(φ), $$\|Y - A(\phi)X(\phi)\|^2 = \|Y\|^2 - Y^* A(\phi) X(\phi) \qquad [\text{Eq. 21}]$$

and Equation 18 may be rewritten as, $$\phi_{MLE} = \arg\max_\phi Y^* A(\phi) X(\phi) \qquad [\text{Eq. 22}]$$

or $$\phi_{MLE} = \arg\max_\phi \|A(\phi)^* Y\|^2 \qquad [\text{Eq. 23}]$$

In Equation 23, $$\|A(\phi)^* Y\|^2 = \sum_k |e^{-j\mu_1(\phi)} Y_{1,k} + e^{-j\mu_2(\phi)} Y_{2,k}|^2 \qquad [\text{Eq. 24}]$$

and $$|e^{-j\mu_1(\phi)} Y_{1,k} + e^{-j\mu_2(\phi)} Y_{2,k}|^2 =$$
$$|Y_{1,k}|^2 + 2Re\{(e^{-j\mu_1(\phi)} Y_{1,k})^* (e^{-j\mu_2(\phi)} Y_{2,k})\} + |Y_{2,k}|^2 \qquad [\text{Eq. 25}]$$

Therefore, Equation 23 may be rewritten as, $$\phi_{MLE} = \text{argmax}_\phi \text{Re}\left\{e^{i(\mu_1(\phi)-\mu_2(\phi))}\sum_k Y_{1,k}^* Y_{2,k}\right\} \quad [\text{Eq. 26}]$$

$$= \text{argmax}_\phi \text{Re}\{e^{i(\mu_1(\phi)-\mu_2(\phi))} Y_1^* Y_2\}$$

It follows that $Y_1^* Y_2$ is a sufficient statistic for computing $\phi_{MLE}$. (The vectors $Y_1$ and $Y_2$ may be reduced to the complex scalar $Y_1^* Y_2$ without any loss of performance.

Note that $$Y_1^* Y_2 \neq \sum_k \frac{Y_{2,k}}{Y_{1,k}}. \quad [\text{Eq. 27}]$$

There is a clear duality between the time and frequency domain formulations. Equation 15 is a frequency-domain formulation of this problem, and Equation 26 yields the associated solution for $\phi_{MLE}$. The time-domain formulation in Equation 11 is structurally identical to Equation 15, so it follows immediately that there is also a time-domain solution given by, $$\phi_{MLE} = \text{argmax}_\phi Re\{e^{i(\mu_1(\phi)-\mu_2(\phi))} y_1^* y_2\} \quad [\text{Eq. 28}]$$

The frequency-domain approach has the immediate advantage that many signals are localized in frequency and noise may be easily eliminated. Of course, one may use a Fourier transform and inverse Fourier transform to eliminate noise in the frequency domain, but solve the problem in the time domain using Equation 28. The latter approach has the disadvantage of require two transforms, so the frequency-domain approach is preferable.

In comparison with algorithms for the single receiver problem, the two receiver algorithm is considerably simpler. In the unknown target signal scenario, this simplicity results from the fact that the inner-product in the sufficient statistic cancels the angular component of the unknown signal.

Single Pair of Antenna Elements and Known Target Signal

Consider the construction of an MLE for the AOA with two receivers where the target signal is known.

$$\begin{pmatrix} y_1 \\ y_2 \end{pmatrix} = \begin{pmatrix} e^{i\mu_1(\phi)} x \\ e^{i\mu_2(\phi)} x \end{pmatrix} z + \begin{pmatrix} v_1 \\ v_2 \end{pmatrix} \quad [\text{Eq. 29}]$$

This equation is entirely similar to Equation 10. The only difference is the introduction of complex scalar z. This permits uncertainty of the amplitude and phase of x which is otherwise known, and is a more practical model. Note that $$\begin{pmatrix} e^{i\mu_1(\phi)} x \\ e^{i\mu_2(\phi)} x \end{pmatrix}$$

is a vector.

In the same manner as the previous development of Equation 15, $$\phi_{MLE} = \text{argmin}_\phi \left\| \begin{pmatrix} Y_1 \\ Y_2 \end{pmatrix} - \begin{pmatrix} e^{i\mu_1(\phi)} X \\ e^{i\mu_2(\phi)} X \end{pmatrix} z \right\|^2 \quad [\text{Eq. 30}]$$

and in the same manner as the previous development of Equation 23, $$\phi_{MLE} = \text{argmax}_\phi \|a(\phi)^* Y\|^2 \quad [\text{Eq. 31}]$$

with $$a(\phi) = \begin{pmatrix} e^{i\mu_1(\phi)} X \\ e^{i\mu_2(\phi)} X \end{pmatrix} \quad [\text{Eq. 32}]$$

In Equation 31, $$\|a(\phi)^* Y\|^2 = |e^{-i\mu_1(\phi)} X^* Y_1 + e^{-i\mu_2(\phi)} X^* Y_2|^2 \quad [\text{Eq. 33}]$$

and, $$|e^{-i\mu_1(\phi)} X^* Y_1 + e^{-i\mu_2(\phi)} X^* Y_2|^2 =$$

$$|X^* Y_1|^2 + 2Re\{(e^{-i\mu_1(\phi)} X^* Y_1)^* e^{-i\mu_2(\phi)} X^* Y_2\} + |X^* Y_2|^2 \quad [\text{Eq. 34}]$$

Therefore, Equation 31 may be rewritten as, $$\phi_{MLE} = \text{argmax}_\phi Re\{e^{i(\mu_1(\phi)-\mu_2(\phi))} (X^* Y_1)^* X^* Y_2\} \quad [\text{Eq. 35}]$$

$X^* Y_1$ and $X^* Y_2$ are sufficient statistics for computing $\phi_{MLE}$. As before, a time-domain formulation is analogous, $$\phi_{MLE} = \text{argmax}_\phi Re\{e^{i(\mu_1(\phi)-\mu_2(\phi))} (x^* y_1)^* x^* y_2\} \quad [\text{Eq. 36}]$$

$x^* y_1$ and $x^* y_2$ are sufficient statistics for computing $\phi_{MLE}$.

In general, in the argument of the argmax function in Equation 31 the expression $\|a(\phi)\|^2$ would appear as a divisor. Here, this expression does not depend on $\phi$ and is ignored. This expression does however depend on X. With only a single element pair, this again may be ignored. With multiple element pairs as discussed subsequently, this must be considered. This is the reason for the subsequent divisions by $|x|^2$ or $|X|^2$.

Multiple Pairs of Antenna Elements

For an unknown target signal, the extension to multiple pairs of elements may be constructed as follows. Refer to Equation 10. With two pairs of elements this may be written as, $$\begin{pmatrix} y_{12} \\ y_{34} \end{pmatrix} = \begin{pmatrix} e^{i\mu_1(\phi)} I & 0 \\ e^{i\mu_2(\phi)} I & \\ & e^{i\mu_3(\phi)} I \\ 0 & e^{i\mu_4(\phi)} I \end{pmatrix} \begin{pmatrix} x_{12} \\ x_{34} \end{pmatrix} + \begin{pmatrix} v_{12} \\ v_{34} \end{pmatrix} \quad [\text{Eq. 37}]$$

where $$y_{12} = \begin{pmatrix} y_1 \\ y_2 \end{pmatrix}.$$

Equation 37 may be written more compactly as, $$y = A(\phi) x + v \quad [\text{Eq. 38}]$$

Then, $$\phi_{MLE}=\mathrm{argmax}_\phi \|A(\phi)^* y\|^2 \qquad [\text{Eq. 39}]$$

as $A(\phi)$ is orthogonal.

$$\phi_{MLE}=\mathrm{argmax}_\phi\{\|A_{12}(\phi)^* y_{12}\|^2+\|A_{34}(\phi)^* y_{34}\|^2\} \qquad [\text{Eq. 40}]$$

where $$A_{12}(\phi) = \begin{pmatrix} e^{i\mu_1(\phi)} I \\ e^{i\mu_2(\phi)} I \end{pmatrix}$$

and $$A_{34}(\phi) = \begin{pmatrix} e^{i\mu_3(\phi)} I \\ e^{i\mu_4(\phi)} I \end{pmatrix}.$$

From previous arguments, $$\phi_{MLE}=\mathrm{argmax}_\phi Re\{e^{i(\mu_1(\phi)-\mu_2(\phi))} y^*_1 y_2 + e^{i(\mu_3(\phi)-\mu_4(\phi))} y^*_3 y_4\} \qquad [\text{Eq. 41}]$$

With an arbitrary number of pairs of elements, $$\phi_{MLE} = \mathrm{argmin}_\phi \sum_n Re\{e^{i(\mu_{2n-1}(\phi)-\mu_{2n}(\phi))} y^*_{2n-1} y_{2n}\} \qquad [\text{Eq. 42}]$$

As before, there is duality between a time and frequency-domain formulation. Let $\alpha_n = e^{i(\mu_{2n}(\phi)-\mu_{2n-1}(\phi))}$. Equation 42 may be thought of as either an inner-product or a correlation, $$\phi_{MLE}=\mathrm{argmax}_\phi Re(\alpha^*\beta) \qquad [\text{Eq. 43}]$$

Where in the time domain, $$\beta_n = y^*_{2n-1} y_{2n} \qquad [\text{Eq. 2}]$$

and in the frequency domain $$\beta_n = Y^*_{2n-1} Y_{2n}. \qquad [\text{Eq. 3}]$$

Consider now a known target signal with multiple pairs of elements. Equation 43 with the associated definitions of $\alpha$ and $\beta$ is easily identified as a generalization of Equations 26 and 28. Similarly, Equations 35 and 36 may also be generalized to Equation 43, where in the time domain $$\beta_n = \frac{(x_n^* y_{2n-1}) * (x_n^* y_{2n})}{|x_n|^2} \qquad [\text{Eq. 4}]$$

and in the frequency domain $$\beta_n = \frac{(X_n^* Y_{2n-1}) * (X_n^* Y_{2n})}{|X_n|^2}. \qquad [\text{Eq. 5}]$$

The subscript n on x and X denotes the known target signal when the $n^{th}$ pair is sampled. The appearance of $|x_n|^2$ and $|X_n|^2$ in the denominator is for the reasons discussed previously.

Estimation of Unknown Target Signal Bandwidth

Consider now the estimation of the bandwidth of an unknown target signal. The estimation process described herein may be used to determine the boundaries of contiguous spectra, and as such, may also be regarded as a signal detection method. Previously it was demonstrated that, for an unknown target signal, $$\phi_{MLE}=\mathrm{argmax}_\phi Re<\alpha,\beta> \qquad [\text{Eq. 44}]$$

where $<\alpha,\beta>$ denotes the inner-product of $\alpha$ and $\beta$. ($<\alpha,\beta>=\alpha^*\beta$.) With a frequency-domain formulation $\beta_n=<Y_{2n-1}, Y_{2n}>$. In general, a target signal may occupy a bandwidth less than that corresponding to the sampling rate, and some points of the Fourier transforms $Y_{2n-1}$ and $Y_{2n}$ may depend only on noise. Intuitively, it may seem that the inner-product for $\beta_n$ should only be computed only over points where the target signal may be non-zero. Essentially this turns out to be correct, but it is also necessary to develop a method for estimation of the bandwidth.

Recall, $$\|Y-A(\phi)X(\phi)\|^2 = \|Y\|^2 - Y^* A(\phi) X(\phi) \qquad [\text{Eq. 21}]$$

One seeks to approximate Y by a judicious choice of $A(\phi)X(\phi)$ and thereby determine $\phi_{MLE}$. $X(\phi)$ is a estimate of the Fourier transform of the unknown target signal. The LHS of Equation 21 is non-negative. Thus, $Y^*A(\phi)X(\phi) \leq \|Y\|^2$. $\phi_{MLE}$ may be determined by maximizing $Y^*A(\phi)X(\phi)$.

Recall, $$Y*A(\phi)X(\phi) = c\|A(\phi)*Y\|^2 = \qquad [\text{Eq. 45}]$$
$$c(<Y_1, Y_1> + 2Re\{e^{i(\mu_1(\phi)-\mu_2 n(\phi))} <Y_1, Y_2>\} + <Y_2, Y_2>)$$

This expression is a function of $\phi$. Assuming that $e^{i(\mu_1(\phi)-\mu_2(\phi))}$ ranges over the unit circle, $$Y*A(\phi_{MLE})X(\phi_{MLE}) = c(\langle Y_1, Y_1\rangle + 2|\langle Y_1, Y_2\rangle| + \langle Y_2, Y_2\rangle) \qquad [\text{Eq. 46}]$$

Consider now the introduction of a bandwidth constraint. Let M denote a set of tuples of $X(\phi)$ where $X(\phi)$ may be non-zero. It is not necessarily the case that $X(\phi)$ is non-zero for these tuples, but it is assumed that $X(\phi)$ is certainly zero for tuples that are not in the set M. More precisely, in $m \notin M \Rightarrow X_m(\phi)=0$. Thus M specifies a bandwidth constraint.

Let $\tilde{X}(\phi)$ denote the vector $X(\phi)$ with the zero tuples deleted. Thus, $\tilde{X}(\phi)$ is a $|M|$-tuple vector. The expression $A(\phi)X(\phi)$ is a linear combination of the columns of $A(\phi)$, and each column is weighted by a tuple of $X(\phi)$. Similarly, let $\tilde{A}(\phi)$ denote the matrix $A(\phi)$ with the columns that are weighted by zero tuples of $X(\phi)$ deleted. In Equations 21, 45 and 46, $X(\phi)$ and $A(\phi)$ may then be replaced with $\tilde{X}(\phi)$ and $\tilde{A}(\phi)$ without consequence, with one exception. The inner-products appearing in Equations 45 and 46 must be computed only over tuples where $X(\phi)$ may be non-zero. Using Equation 45 Equation 21 may be rewritten as, $$\|Y-\tilde{A}(\phi_{MLE})\tilde{X}(\phi_{MLE})\|^2 = <Y_1, Y_1> + <Y_2, Y_2> - \qquad [\text{Eq. 47}]$$
$$c(<Y_1, Y_1>_M + 2|<Y_1, Y_2>_M| + <Y_2, Y_2>_M)$$

The inner-product subscript M denotes a computation over only the non-zero tuples specified by M, and no subscript indicates the ordinary computation over all tuples. Let, $$E(M)=Y-\tilde{A}(\phi_{MLE})\tilde{X}(\phi_{MLE}) \qquad [\text{Eq. 48}]$$

$E(M)$ is the error between Y and the optimal estimate $\tilde{A}(\phi_{MLE})\tilde{X}(\phi_{MLE})$. M denotes the dependence of the error on the bandwidth constraint. From Equation 47

$$\|E(M)\|^2 = <Y_1, Y_1> + <Y_2, Y_2> - c(<Y_1,Y_1>_M + 2|<Y_1,Y_2>_M| + <Y_2,Y_2>_M) \quad [\text{Eq. 8}]$$

The bandwidth may be estimated by using multiple hypotheses and generalized log likelihood ratio tests (GLLRT). See A. D. Whalen, "Detection of Signals in Noise", Academic Press, Second Edition, 1995. Suppose that one is deciding between bandwidth hypothesis $M_1$ and $M_2$. The resulting GLLRT is given by, $$\|E(M_1)\|^2 - \|E(M_2)\|^2 \underset{M_2}{\overset{M_1}{\lessgtr}} \lambda(M_1, M_2) \quad [\text{Eq. 7}]$$

Where $\lambda(M_1, M_2)$ is an appropriately chosen constant threshold. For example, an appropriate rule in the context of DF is to determine $\lambda(M_1, M_2)$ by, $$\lambda(M_2, M_2) = \text{argmin } Var\{\phi_{MLE}\} \quad [\text{Eq. 49}]$$

Equation 49 is easily solved by simulation. Observe that Equation 49 is a Bayesian criterion, as the cost of error, as measured by the variance of $\phi_{MLE}$, may differ between $M_1$ and $M_2$. The extension to more than a binary hypothesis may be accomplished by performing pair wise tests. In other words, $$\begin{matrix} \|E(M_1)\|^2 - \|E(M_2)\|^2 < \lambda(M_1, M_2) \\ \|E(M_1)\|^2 - \|E(M_3)\|^2 < \lambda(M_1, M_3) \end{matrix} \Rightarrow M_1 \quad [\text{Eq. 9}]$$

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of estimating the angle of arrival of a target signal received by an array of antenna elements, comprising the steps of:
   (a) with a pair of receivers, simultaneously obtaining samples of a received target signal from multiple elements of an array of antenna elements; and
   (b) with a computer, processing the simultaneously obtained samples of the target signal to determine a maximum likelihood estimation (MLE) of the angle of arrival $\phi$ of the target signal by using the following equation:

$$\phi_{MLE} = \text{argmax}_\phi Re(\alpha^*\beta)$$

wherein $\alpha$ is a complex vector that represents a phase difference associated with the angle of arrival that should be observed upon receipt of the signal by two particular antenna elements from which the samples are obtained; and $\beta$ represents the phase difference that is observed upon receipt of the signal by the two particular antenna elements from which the samples are obtained;

wherein when the target signal is unknown, $\beta_n = y^*_{2n-1} y_{2n}$ in the time domain and $\beta_n = Y^*_{2n-1} Y_{2n}$ in the frequency domain, wherein $y_{2n-1}$ and $y_{2n}$ are complex N-tuple vectors representing the samples obtained from the nth simultaneously sampled pair of antenna elements and Y is a Fourier transform of y.

2. A method according to claim 1, wherein for a phased array of said antenna elements, $\alpha_n = e^{j(\mu_{2n}(\Phi) - \mu_{2n-1}(\Phi))}$, wherein $\mu$ is a function of the angle of arrival that depends upon the geometry of the array of antenna elements.

3. A method according to claim 1, further comprising the steps of:
   (c) estimating the bandwidth of the received target signal by using binary hypotheses and a generalized log likelihood ratio test (GLLRT):

$$\|E(M_1)\|^2 - \|E(M_2)\|^2 \underset{M_2}{\overset{M_1}{\lessgtr}} \lambda(M_1, M_2)$$

wherein $\lambda(M_1, M_2)$ is an appropriately chosen constant threshold;

wherein M specifies a bandwidth constraint expressed by a set of tuples of $X(\phi)$ where $X(\phi)$ may be non-zero, $X(\phi)$ is an estimate of the Fourier transform of the unknown target signal, Y is a Fourier transform of the sample obtained from the sampled antenna element, and $$\|E(M)\|^2 = <Y_1, Y_1> + <Y_2, Y_2> - c(<Y_1,Y_1>_M + 2|<Y_1,Y_2>_M| + <Y_2,Y_2>_M); \text{ and}$$

(d) deriving the value of $\beta_n = <Y_{2n-1}, Y_{2n}>_M$ in the frequency domain or the value of $\beta_n = <y_{2n-1}, y_{2n}>_M$ in the time domain by using the respective value of M that is associated with the estimated bandwidth pursuant to said GLLRT.

4. A method according to claim 1, further comprising the steps of:
   (c) estimating the bandwidth of the received target signal by using multiple hypotheses and pair wise generalized log likelihood ratio tests in accordance with:

$$\begin{matrix} \|E(M_1)\|^2 - \|E(M_2)\|^2 < \lambda(M_1, M_2) \\ \|E(M_1)\|^2 - \|E(M_3)\|^2 < \lambda(M_1, M_3) \end{matrix} \Rightarrow M_1$$

wherein M specifies a bandwidth constraint expressed by a set of tuples of $X(\phi)$ where $X(\phi)$ may be non-zero, $X(\phi)$ is an estimate of the Fourier transform of the unknown target signal,
Y is a Fourier transform of the sample obtained from the sampled antenna element, and $$\|E(M)\|^2 = <Y_1, Y_1> + <Y_2, Y_2> -$$
$$c(<Y_1, Y_1>_M + 2|<Y_1, Y_2>_M| + <Y_2, Y_2>_M);$$

(d) deriving the value of $\beta_n = <Y_{2n-1}, Y_{2n}>_M$ in the frequency domain or the value of $\beta_n = <y_{2n-1}, y_{2n}>_M$ in the time domain by using the respective value of M that is associated with the estimated bandwidth pursuant to said generalized log likelihood ratio tests.

5. A method of estimating the angle of arrival of a target signal received by an array of antenna elements, comprising the steps of:
(a) with a pair of receivers, simultaneously obtaining samples of a received target signal from multiple elements of an array of antenna elements; and
(b) with a computer, processing the simultaneously obtained samples of the target signal to determine a maximum likelihood estimation (MLE) of the angle of arrival $\phi$ of the target signal by using the following equation:

$$\phi_{MLE} = \text{argmax}_\phi Re(\alpha^* \beta)$$

wherein $\alpha$ is a complex vector that represents a phase difference associated with the angle of arrival that should be observed upon receipt of the signal by two particular antenna elements from which the samples are obtained; and
$\beta$ represents the phase difference that is observed upon receipt of the signal by the two particular antenna elements from which the samples are obtained;
wherein when the target signal is known, $$\beta_n = \frac{(x_n^* y_{2n-1}) * (x_n^* y_{2n})}{|x_n|^2}$$

in the time domain and $$\beta_n = \frac{(X_n^* Y_{2n-1}) * (X_n^* Y_{2n})}{|X_n|^2}$$

in the frequency domain,
wherein X and Y are Fourier transforms of x and y respectively,
wherein $x_n$ and $X_n$ are complex N-tuple vectors representing the known target signal in the time domain and in the frequency domain respectively; and
wherein $y_{2n-1}$ and $y_{2n}$ are complex N-tuple vectors representing the samples obtained from the nth simultaneously sampled pair of antenna elements and Y is a Fourier transform of y.

6. A method according to claim 5, wherein for a phased array of said antenna elements, $\alpha_n = e^{i(\mu_{2n}(\phi) - \mu_{2n-1}(\phi))}$,
wherein $\mu$ is a function of the angle of arrival that depends upon the geometry of the array of antenna elements.

7. A method of estimating the bandwidth of a target signal received by an array of antenna elements, comprising the steps of:

(a) with a pair of receivers, simultaneously obtaining samples of a received target signal from multiple elements of an array of antenna elements; and
(b) with a computer, processing the simultaneously obtained samples of the target signal to estimate the bandwidth of the received target signal by using binary hypotheses and a generalized log likelihood ratio test (GLLRT).

8. A method according to claim 7, wherein the GLLRT is:

$$\|E(M_1)\|^2 - \|E(M_2)\|^2 \underset{M_2}{\overset{M_1}{\lessgtr}} \lambda(M_1, M_2)$$

wherein $\lambda(M_1, M_2)$ is an appropriately chosen constant threshold;
wherein M specifies a bandwidth constraint expressed by a set of tuples of $X(\phi)$ where $X(\phi)$ may be non-zero,
$X(\phi)$ is an estimate of the Fourier transform of the unknown target signal,
Y is a Fourier transform of the sample obtained from the sampled antenna element, and $$\|E(M)\|^2 = <Y_1, Y_1> +$$
$$<Y_2, Y_2> -c(<Y_1, Y_1>_M + 2|<Y_1, Y_2>_M| + <Y_2, Y_2>_M).$$

9. A method according to claim 8, wherein $\lambda(M_1, M_2) = \text{argmin Var}\{\phi_{MLE}\}$.

10. A method of estimating the bandwidth of a target signal received by an array of antenna elements, comprising the steps of:
(a) with a pair of receivers, simultaneously obtaining samples of a received target signal from multiple elements of an array of antenna elements; and
(b) with a computer, processing the simultaneously obtained samples of the target signal to estimate the bandwidth of the received target signal by using multiple hypotheses and pair wise generalized log likelihood ratio tests in accordance with:

$$\begin{matrix}\|E(M_1)\|^2 - \|E(M_2)\|^2 < \lambda(M_1, M_2) \\ \|E(M_1)\|^2 - \|E(M_3)\|^2 < \lambda(M_1, M_3)\end{matrix} \Rightarrow M_1$$

wherein M specifies a bandwidth constraint expressed by a set of tuples of $X(\phi)$ where $X(\phi)$ may be non-zero,
$X(\phi)$ is an estimate of the Fourier transform of the unknown target signal,
Y is a Fourier transform of the sample obtained from the sampled antenna element, and $$\|E(M)\|^2 = <Y_1, Y_1> +$$
$$<Y_2, Y_2> -c(<Y_1, Y_1>_M + 2|<Y_1, Y_2>_M| + <Y_2, Y_2>_M).$$

11. A system for estimating the angle of arrival of a target signal received by an array of antenna elements, comprising:
a pair of receivers adapted for simultaneously obtaining samples of a received target signal from multiple elements of an array of antenna elements; and a computer adapted for processing the simultaneously obtained samples of the target signal to determine a maximum likelihood estimation (MLE) of the angle of arrival ϕ of the target signal by using the following equation:

$$\phi_{MLE}=\text{argmax}_\phi Re(\alpha^*\beta)$$

wherein α is a complex vector that represents a phase difference associated with the angle of arrival that should be observed upon receipt of the signal by two particular antenna elements from which the samples are obtained; and β represents the phase difference that is observed upon receipt of the signal by the two particular antenna elements from which the samples are obtained;

wherein when the target signal is unknown, $\beta_n = y^*_{2n-1} y_{2n}$ in the time domain and $\beta_n = Y^*_{2n-1} Y_{2n}$ in the frequency domain, wherein $y_{2n-1}$ and $y_{2n}$ are complex N-tuple vectors representing the samples obtained from the nth simultaneously sampled pair of antenna elements and Y is a Fourier transform of y.

12. A system according to claim 11, further comprising:

means for estimating the bandwidth of the received target signal by using binary hypotheses and a generalized log likelihood ratio test (GLLRT); and means for deriving the value of $\beta_n = <Y_{2n-1}, Y_{2n}>_M$ in the frequency domain or the value of $\beta_n = <y_{2n-1}, y_{2n}>_M$ in the time domain by using the respective value of M that is associated with the estimated bandwidth pursuant to said GLLRT.

13. A system according to claim 11, further comprising the steps of:

means for estimating the bandwidth of the received target signal by using multiple hypotheses and pair wise generalized log likelihood ratio tests in accordance with:

$$\begin{aligned}\|E(M_1)\|^2 - \|E(M_2)\|^2 < \lambda(M_1, M_2) \\ \|E(M_1)\|^2 - \|E(M_3)\|^2 < \lambda(M_1, M_3)\end{aligned} \Rightarrow M_1$$

wherein M specifies a bandwidth constraint expressed by a set of tuples of X(ϕ) where X(ϕ) may be non-zero, X(ϕ) is an estimate of the Fourier transform of the unknown target signal, Y is a Fourier transform of the sample obtained from the sampled antenna element, and $$\|E(M)\|^2 = <Y_1, Y_1> +$$
$$<Y_2, Y_2> -c(<Y_1, Y_1>_M +2|<Y_1, Y_2>_M|+<Y_2, Y_2>_M);$$

means for deriving the value of $\beta_n = <Y_{2n-1}, Y_{2n}>_M$ in the frequency domain or the value of $\beta_n = <y_{2n-1}, y_{2n}>_M$ in the time domain by using the respective value of M that is associated with the estimated bandwidth pursuant to said generalized log likelihood ratio tests.

14. A system for estimating the angle of arrival of a target signal received by an array of antenna elements, comprising the steps of:

a pair of receivers adapted for simultaneously obtaining samples of a received target signal from multiple elements of an array of antenna elements; and a computer adapted for processing the simultaneously obtained samples of the target signal to determine a maximum likelihood estimation (MLE) of the angle of arrival ϕ of the target signal by using the following equation:

$$\phi_{MLE}=\text{argmax}_\phi Re(\alpha^*\beta)$$

wherein α is a complex vector that represents a phase difference associated with the angle of arrival that should be observed upon receipt of the signal by two particular antenna elements from which the samples are obtained; and β represents the phase difference that is observed upon receipt of the signal by the two particular antenna elements from which the samples are obtained;

wherein when the target signal is known, $$\beta_n = \frac{(x_n^* y_{2n-1})*(x_n^* y_{2n})}{|x_n|^2}$$

in the time domain and $$\beta_n = \frac{(X_n^* Y_{2n-1})*(X_n^* Y_{2n})}{|X_n|^2}$$

in the frequency domain, wherein X and Y are Fourier transforms of x and y respectively, wherein $x_n$ and $X_n$ are complex N-tuple vectors representing the known target signal in the time domain and in the frequency domain respectively; and wherein $y_{2n-1}$ and $y_{2n}$ are complex N-tuple vectors representing the samples obtained from the nth simultaneously sampled pair of antenna elements and Y is a Fourier transform of y.

15. A system for estimating the bandwidth of a target signal received by an array of antenna elements, comprising the steps of:

a pair of receivers adapted for simultaneously obtaining samples of a received target signal from multiple elements of an array of antenna elements; and a computer adapted for processing the simultaneously obtained samples of the target signal to estimate the bandwidth of the received target signal by using binary hypotheses and a generalized log likelihood ratio test (GLLRT).

16. A system according to claim 15, wherein the GLLRT is:

$$\|E(M_1)\|^2 - \|E(M_2)\|^2 \overset{M_1}{\underset{M_2}{\lessgtr}} \lambda(M_1, M_2)$$

wherein $\lambda(M_1, M_2)$ is an appropriately chosen constant threshold;

wherein M specifies a bandwidth constraint expressed by a set of tuples of X(ϕ) where X(ϕ) may be non-zero, X(ϕ) is an estimate of the Fourier transform of the unknown target signal, Y is a Fourier transform of the sample obtained from the sampled antenna element, and $$\|E(M)\|^2 = \langle Y_1, Y_1 \rangle + \langle Y_2, Y_2 \rangle - c(\langle Y_1, Y_1 \rangle_M + 2|\langle Y_1, Y_2 \rangle_M| + \langle Y_2, Y_2 \rangle_M).$$

17. A system according to claim 16, wherein $\lambda(M_1, M_2) = \text{argmin Var}\{\phi_{MLE}\}$.

18. A system for estimating the bandwidth of a target signal received by an array of antenna elements, comprising the steps of:
   a pair of receivers adapted for simultaneously obtaining samples of a received target signal from multiple elements of an array of antenna elements; and
   a computer adapted for processing the simultaneously obtained samples of the target signal to estimate the bandwidth of the received target signal by using multiple hypotheses and pair wise generalized log likelihood ratio tests in accordance with:

$$\begin{array}{l}\|E(M_1)\|^2 - \|E(M_2)\|^2 < \lambda(M_1, M_2) \\ \|E(M_1)\|^2 - \|E(M_3)\|^2 < \lambda(M_1, M_3)\end{array} \Rightarrow M_1$$

wherein M specifies a bandwidth constraint expressed by a set of tuples of $X(\phi)$ where $X(\phi)$ may be non-zero,
$X(\phi)$ is an estimate of the Fourier transform of the unknown target signal,
Y is a Fourier transform of the sample obtained from the sampled antenna element, and $$\|E(M)\|^2 = \langle Y_1, Y_1 \rangle + \langle Y_2, Y_2 \rangle - c(\langle Y_1, Y_1 \rangle_M + 2|\langle Y_1, Y_2 \rangle_M| + \langle Y_2, Y_2 \rangle_M).$$

19. A computer readable storage medium for use with a computer in a system for determining the angle of arrival of a target signal received by an array of antenna elements, wherein the system comprises: a pair of receivers adapted for simultaneously obtaining samples of a received target signal from multiple elements of an array of antenna elements; and a computer,
   wherein the computer readable storage medium contains computer executable program instructions for causing the computer to process the simultaneously obtained samples of the target signal to determine a maximum likelihood estimation (MLE) of the angle of arrival $\phi$ of the target signal by using the following equation:

$$\phi_{MLE} = \text{argmax}_\phi Re(\alpha^* \beta)$$

wherein $\alpha$ is a complex vector that represents a phase difference associated with the angle of arrival that should be observed upon receipt of the signal by two particular antenna elements from which the samples are obtained; and
$\beta$ represents the phase difference that is observed upon receipt of the signal by the two particular antenna elements from which the samples are obtained;
   wherein when the target signal is unknown, $\beta_n = y^*_{2n-1} y_{2n}$ in the time domain and $\beta_n = Y^*_{2n-1} Y_{2n}$ in the frequency domain,
   wherein $y_{2n-1}$ and $y_{2n}$ are complex N-tuple vectors representing the samples obtained from the nth simultaneously sampled pair of antenna elements and Y is a Fourier transform of y.

20. A computer readable storage medium according to claim 19, wherein for a phased array of said antenna elements, $\alpha_n = e^{i(\mu_{2n}(\phi) - \mu_{2n-1}(\phi))}$, wherein $\mu$ is a function of the angle of arrival that depends upon the geometry of the array of antenna elements.

21. A computer readable storage medium according to claim 19, further comprising the steps of:
   (c) estimating the bandwidth of the received target signal by using binary hypotheses and a generalized log likelihood ratio test (GLLRT):

$$\|E(M_1)\|^2 - \|E(M_2)\|^2 \underset{M_2}{\overset{M_1}{\lessgtr}} \lambda(M_1, M_2)$$

wherein $\lambda(M_1, M_2)$ is an appropriately chosen constant threshold;
wherein M specifies a bandwidth constraint expressed by a set of tuples of $X(\phi)$ where $X(\phi)$ may be non-zero,
$X(\phi)$ is an estimate of the Fourier transform of the unknown target signal,
Y is a Fourier transform of the sample obtained from the sampled antenna element, and $$\|E(M)\|^2 = \langle Y_1, Y_1 \rangle + \langle Y_2, Y_2 \rangle - c(\langle Y_1, Y_1 \rangle_M + 2|\langle Y_1, Y_2 \rangle_M| + \langle Y_2, Y_2 \rangle_M);$$

and (d) deriving the value of $\beta_n = \langle Y_{2n-1}, Y_{2n} \rangle_M$ in the frequency domain or the value of $\beta_n = \langle y_{2n-1}, y_{2n} \rangle_M$ in the time domain by using the respective value of M that is associated with the estimated bandwidth pursuant to said GLLRT.

22. A computer readable storage medium according to claim 19, further comprising the steps of:
   (c) estimating the bandwidth of the received target signal by using multiple hypotheses and pair wise generalized log likelihood ratio tests in accordance with:

$$\begin{array}{l}\|E(M_1)\|^2 - \|E(M_2)\|^2 < \lambda(M_1, M_2) \\ \|E(M_1)\|^2 - \|E(M_3)\|^2 < \lambda(M_1, M_3)\end{array} \Rightarrow M_1$$

wherein M specifies a bandwidth constraint expressed by a set of tuples of $X(\phi)$ where $X(\phi)$ may be non-zero,
$X(\phi)$ is an estimate of the Fourier transform of the unknown target signal,
Y is a Fourier transform of the sample obtained from the sampled antenna element, and $$\|E(M)\|^2 = \langle Y_1, Y_1 \rangle + \langle Y_2, Y_2 \rangle - c(\langle Y_1, Y_1 \rangle_M + 2|\langle Y_1, Y_2 \rangle_M| + \langle Y_2, Y_2 \rangle_M);$$

(d) deriving the value of $\beta_n = \langle Y_{2n-1}, Y_{2n} \rangle_M$ in the frequency domain or the value of $\beta_n = \langle y_{2n-1}, y_{2n} \rangle_M$ in the time domain by using the respective value of M that is associated with the estimated bandwidth pursuant to said generalized log likelihood ratio tests.

23. A computer readable storage medium for use with a computer in a system for determining the angle of arrival of a target signal received by an array of antenna elements, wherein the system comprises: a pair of receivers adapted for simultaneously obtaining samples of a received target signal from multiple elements of an array of antenna elements; and a computer,
   wherein the computer readable storage medium contains computer executable program instructions for causing the computer to process the simultaneously obtained samples of the target signal to determine a maximum likelihood estimation (MLE) of the angle of arrival $\phi$ of the target signal by using the following equation:

$$\phi_{MLE} = \text{argmax}_\phi Re(\alpha^*\beta)$$

wherein $\alpha$ is a complex vector that represents a phase difference associated with the angle of arrival that should be observed upon receipt of the signal by two particular antenna elements from which the samples are obtained; and
$\beta$ represents the phase difference that is observed upon receipt of the signal by the two particular antenna elements from which the samples are obtained;
wherein when the target signal is known, $$\beta_n = \frac{(x_n^* y_{2n-1}) * (x_n^* y_{2n})}{|x_n|^2}$$

in the time domain and $$\beta_n = \frac{(X_n^* Y_{2n-1}) * (X_n^* Y_{2n})}{|X_n|^2}$$

in the frequency domain,
wherein X and Y are Fourier transforms of x and y respectively,
wherein $x_n$ and $X_n$ are complex N-tuple vectors representing the known target signal in the time domain and in the frequency domain respectively; and
wherein $Y_{2n-1}$ and $y_{2n}$ are complex N-tuple vectors representing the samples obtained from the nth simultaneously sampled pair of antenna elements and Y is a Fourier transform of y.

24. A computer readable storage medium according to claim 23, wherein for a phased array of said antenna elements, $\alpha_n = e^{i(\mu_{2n}(\phi) - \mu_{2n-1}(\phi))}$, wherein $\mu$ is a function of the angle of arrival that depends upon the geometry of the array of antenna elements.

25. A computer readable storage medium for use with a computer in a system for estimating the bandwidth of a target signal received by an array of antenna elements, wherein the system comprises: a pair of receivers adapted for simultaneously obtaining samples of a received target signal from multiple elements of an array of antenna elements; and a computer,
wherein the computer readable storage medium contains computer executable program instructions for causing the computer to process the simultaneously obtained samples of the target signal to estimate the bandwidth of the received target signal by using binary hypotheses and a generalized log likelihood ratio test (GLLRT).

26. A computer readable storage medium according to claim 25, wherein the GLLRT is:

$$\|E(M_1)\|^2 - \|E(M_2)\|^2 \underset{M_2}{\overset{M_1}{\lessgtr}} \lambda(M_1, M_2)$$

wherein $\lambda(M_1, M_2)$ is an appropriately chosen constant threshold;
wherein M specifies a bandwidth constraint expressed by a set of tuples of $X(\phi)$ where $X(\phi)$ may be non-zero,
$X(\phi)$ is an estimate of the Fourier transform of the unknown target signal,
Y is a Fourier transform of the sample obtained from the sampled antenna element, and $$\|E(M)\|^2 = \langle Y_1, Y_1 \rangle + \langle Y_2, Y_2 \rangle - c(\langle Y_1, Y_1 \rangle_M + 2|\langle Y_1, Y_2 \rangle_M| + \langle Y_2, Y_2 \rangle_M).$$

27. A computer readable storage medium according to claim 26, wherein $\lambda(M_1, M_2) = \text{argmin V ar}\{\phi_{MLE}\}$.

28. A computer readable storage medium for use with a computer in a system for estimating the bandwidth of a target signal received by an array of antenna elements, wherein the system comprises: a pair of receivers adapted for simultaneously obtaining samples of a received target signal from multiple elements of an array of antenna elements; and a computer,
wherein the computer readable storage medium contains computer executable program instructions for causing the computer to process the simultaneously obtained samples of the target signal to estimate the bandwidth of the received target signal by using multiple hypotheses and pair wise generalized log likelihood ratio tests in accordance with:

$$\begin{aligned}\|E(M_1)\|^2 - \|E(M_2)\|^2 &< \lambda(M_1, M_2) \\ \|E(M_1)\|^2 - \|E(M_3)\|^2 &< \lambda(M_1, M_3)\end{aligned} \Rightarrow M_1$$

wherein M specifies a bandwidth constraint expressed by a set of tuples of $X(\phi)$ where $X(\phi)$ may be non-zero,
$X(\phi)$ is an estimate of the Fourier transform of the unknown target signal,
Y is a Fourier transform of the sample obtained from the sampled antenna element, and $$\|E(M)\|^2 = \langle Y_1, Y_1 \rangle + \langle Y_2, Y_2 \rangle - c(\langle Y_1, Y_1 \rangle_M + 2|\langle Y_1, Y_2 \rangle_M| + \langle Y_2, Y_2 \rangle_M).$$

* * * * *

UNITED STATES PATENT AND TRADEMARK OFFICE
CERTIFICATE OF CORRECTION

| | | |
|---|---|---|
| PATENT NO. | : 8,031,119 B1 | Page 1 of 1 |
| APPLICATION NO. | : 12/511783 | |
| DATED | : October 4, 2011 | |
| INVENTOR(S) | : James Covosso Francis and David Delaney McGann | |

It is certified that error appears in the above-identified patent and that said Letters Patent is hereby corrected as shown below:

IN THE SPECIFICATIONS:

At column 9, line 28, in Equation 42 "argmin$\varphi$" should be --argmax$\varphi$--.

At column 11, line 27, in Equation 49 "M2" (first occurrence) should be --M1--.

Signed and Sealed this
Thirty-first Day of January, 2012

David J. Kappos
*Director of the United States Patent and Trademark Office*